United States Patent [19]

Frank et al.

[11] Patent Number: 4,637,447

[45] Date of Patent: Jan. 20, 1987

[54] SUN SHIELD

[75] Inventors: Arthur M. Frank, Plainview; Silvio F. DeRespinis, Copiague; John Mockovciak, Jr., Bayville, all of N.Y.

[73] Assignee: The United States of America as represented by the Administrator of the National Aeronautics and Space Administration, Washington, D.C.

[21] Appl. No.: 764,805

[22] Filed: Aug. 12, 1985

[51] Int. Cl.[4] .......................... A47H 1/00; B64G 1/58
[52] U.S. Cl. .................................. 160/265; 160/23 R; 244/121; 244/158 R; 135/903; 296/100
[58] Field of Search .............. 244/121, 158 R, 158 A, 244/160, 163; 114/361; 343/18; 160/20, 23 R, 25, 26, 29, 265; 135/89, 903; 296/100; 47/117

[56] References Cited

U.S. PATENT DOCUMENTS

| | | | |
|---|---|---|---|
| 2,346,554 | 4/1944 | Clark | 296/100 |
| 2,823,684 | 2/1958 | Sartori | 135/6 |
| 2,877,722 | 3/1959 | Peat | 296/100 |
| 3,310,256 | 3/1967 | Parmley | 244/1 |
| 3,348,790 | 10/1967 | Crowder et al. | 244/1 |
| 3,402,412 | 9/1968 | Seipos | 160/25 |
| 3,768,540 | 10/1973 | McSwain | 296/100 |
| 3,829,154 | 8/1974 | Becknell | 160/23 R |
| 3,923,074 | 12/1975 | McKee | 135/903 |
| 3,980,998 | 9/1976 | McIntosh | 340/258 B |
| 4,030,780 | 6/1977 | Petretti | 296/100 |
| 4,106,145 | 8/1978 | Gillen et al. | 9/5 |
| 4,231,624 | 11/1980 | Neilsen | 312/186 |
| 4,314,682 | 2/1982 | Barnett et al. | 244/121 |
| 4,387,533 | 6/1983 | Green et al. | 47/17 |

Primary Examiner—Galen Barefoot
Assistant Examiner—Lynn M. Fiorito
Attorney, Agent, or Firm—Hardie R. Barr; John R. Manning; Marvin F. Matthews

[57] ABSTRACT

A shading device capable of compactly storing a flexible shade on a biased, window-shade type spring roller and controlled to deliver the shade selectively to either its operative shading or compact storage orientation.

4 Claims, 7 Drawing Figures

SUN SHIELD

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD OF THE INVENTION

The orbiter spacecraft developed by NASA has a bay area with doors which are closed during launch and which, in orbit, may be opened to admit and discharge cargo. In case the cargo is thermally sensitive, for instance a satellite, it may be necessary to shade the same from direct sunlight upon opening of the bay doors in orbit.

Applicant has not found, in the prior art, shading devices anticipatory of the present invention. Typical of such prior devices among United States patents are Sartori U.S. Pat. No. 2,823,684 and Gillen et al U.S. Pat. No. 4,106,145 disclosing canopies for boats supported in shading position by angular ribs and collapsible with said ribs. None discloses flexible shading means which may be selectively deployed into shading configuration with the aid of partial disk-like end elements which guide and support the shading material during deployment.

SUMMARY OF THE INVENTION

According, an object of the invention is to provide a novel sun shield device which may be selectively stored compactly near an area to be shielded and extended or unfurled, as desired, to cover and shade its contents.

A more detailed object is to provide a shading device adapted for mounting in the cargo bay of an orbiter spacecraft and capable of closing to cover, when deployed, a light sensitive and/or heat-sensitive cargo, for instance a satellite, to protect the same from direct rays of the sun and opening to expose, when retracted, the cargo space, as for loading and discharge.

According to the invention, a flexible shading blanket or curtain is stored, when retracted, compactly rolled on a window shade type spring roller adjacent to a rotary member which consists of one or more partial, disk-like parallel members extending marginal to and substantially co-extensive with said spring roller. A bar or beam spans the periphery of said parallel rotary members and engages an end of said blanket as the rotary member is rotated to withdraw the blanket from the spring roller and guide the same to its shading configuration. The blanket is secured during deployment and in its shading position by cables bearing against the blanket holding it against the rotary end members. The cables, also, enforce rotation of the rotary end members. The blanket and cables are locked in shading position and when unlocked, permit return of the blanket to the spring roller and retraction of the cables and end members to the stored, inoperative position of the blanket.

BRIEF DESCRIPTIONS OF THE DRAWINGS

DETAILED DESCRIPTIONS OF THE DRAWINGS

The invention has particular utility as applied to the cargo bay A of the orbiter spacecraft (FIG. 1) for shading the cargo space and/or a light-sensitive cargo, as a satellite B, from the direct rays of the sun. However, the shading device is capable of use in other applications, where selective shading may be useful or necessary, for instance greenhouses, swimming pools, boats, and the like.

Figure 3:
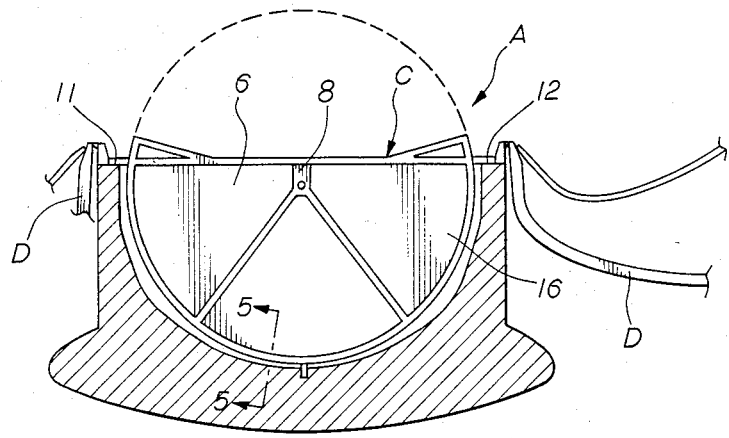
FIG. 3 is an inside elevation of one fixed base end member.

In accordance with this invention, there is rigidly mounted in the cargo bay area of the orbiter, a fixed base structure C comprising a pair of generally semi-circular, parallel, fixed end members 6 and 7, each with a central diametral boss 8 (FIG. 3) for pivotal support of the rotary shading end members 13 and 14. The base structure is open at the top for admission and discharge of cargo through the cargo doors D. In the central lower portion of the base structure is a U-shaped cradle E upon which rests the satellite B. The upper ends of the cradle arms 9 and 10 are attached to the longeron side sills 11 and 12.

Rotary shading member F, likewise, has generally half-circular, parallel rotary end members 13 and 14, with pivotal support bosses 15 registering with bosses 8 on fixed end members 6 and 7.

A bar or beam 17 extends longitudinally between rotary end members 13 and 14, for a purpose to be described.

Each of the end members (fixed end members 6 and 7 and rotary end members 13 and 14) is of skeletal construction for lightness and has an outer face covered by an opaque blanket or curtain 16 (FIG. 5), or otherwise made opaque for good shading. In addition, a blanket or curtain 18 of flexible opaque material (polyimide film being suggested, such as that sold under the trademark "KAPTON" and having characteristics as described in DuPont Bulletin GS-85-3, "KAPTON Polyimid Film General Specifications Bulletin," third edition, 1985) may span the cylindrical space within rotary shading member F as a shading curtain.

Figure 6:
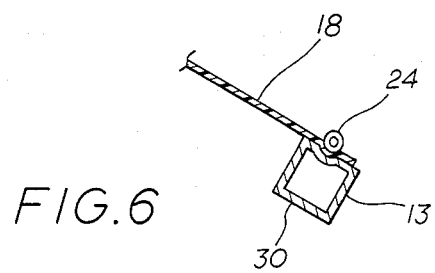
FIG. 6 is a detail section taken on line 6—6 of FIG. 4.
Figure 7:
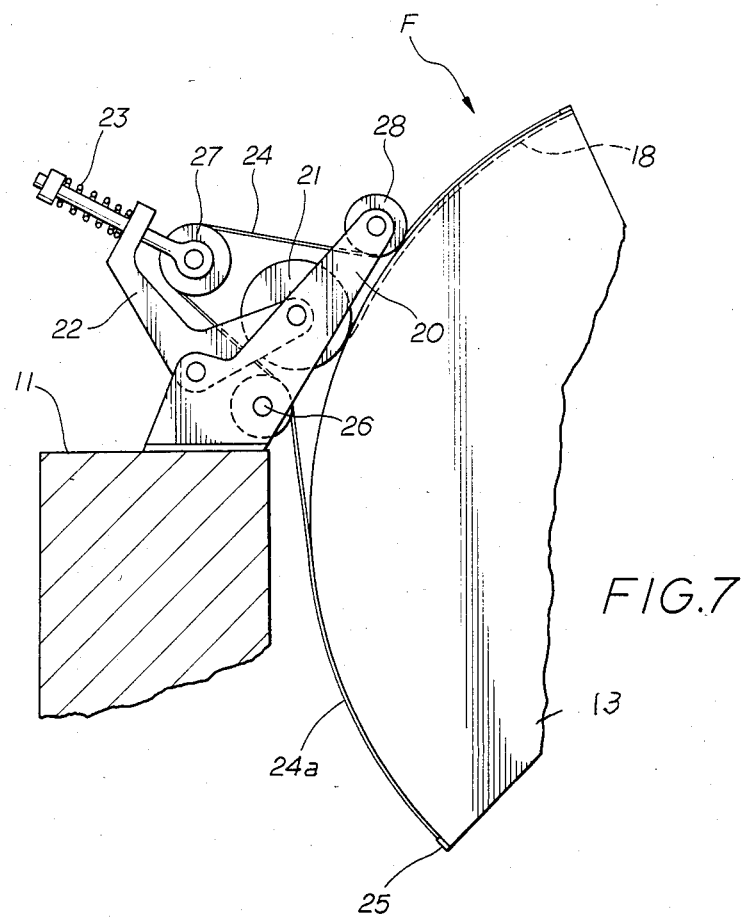
FIG. 7 is an enlarged side view of one of the shade stretching and manipulating mechanisms.

Shading blanket or curtain 18 is normally, compactly, stored on its spring roller 21 and manipulated, selectively, to shade and expose the sensitive cargo by the deployment mechanism shown in FIG. 7. Two of these mechanisms are mounted on longeron sill 11, one adjacent each rotary end member 13 and 14. Each mechanism includes a bellcrank 22 on which storage spring roller 21 is secured at one arm, the other arm of which is biased by the cable tensioning spring 23. A cable or chain 24, 24a extends from the lower peripheral end 25 of the adjacent half rotary end member 13 over a powered drive pulley or sprocket 26, and cable tensioning pulleys 27 and 28 thence along the periphery of rotary end member 13 (against the blanket 18) (FIG. 6) to the bar or beam 17 at the upper peripheral end of rotary end member 13. Drive pulley or sprocket 26 and tensioning pulley 28 are supported by bracket 20.

Figure 5:
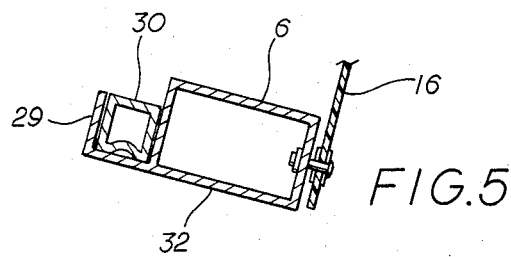
FIG. 5 is a detail section taken on line 5—5 of FIG. 3.

FIGS. 5 and 6 illustrate interfitting edge configurations, respectively, of rotary and fixed end members 13 and 6 and 14 and 7, both of box section for strength. U-shaped lateral projections 29 on members 6 and 7 slidably receive rotary member box edge element 30 for guiding and stabilizing rotation of rotary shading member F during the lower part of the rotation thereof. The opaque blanket 16 (FIG. 5) covering an outer face of fixed end member 6 is slightly spaced from edge of box 32 for insulation and the opaque blanket or curtain covering the outer face of rotary end member 13 is omitted from the figure.

Operation

As drive roller 26 is powered in the curtain unwinding direction, cable 24 rotates rotary shading member F with beam 17 to draw blanket 18 from spring roller 21 about rotary shading member F, thus impelling the blanket to conform with the generally cylindrical shape defined by the peripheries of rotary end members 13 and 14. Cables 24 serve to hold the blanket against rotary member F and to pull on lower peripheral end 25 of rotary end member 13 to rotate rotary shading member F to the shading or closed position.

Figure 1:
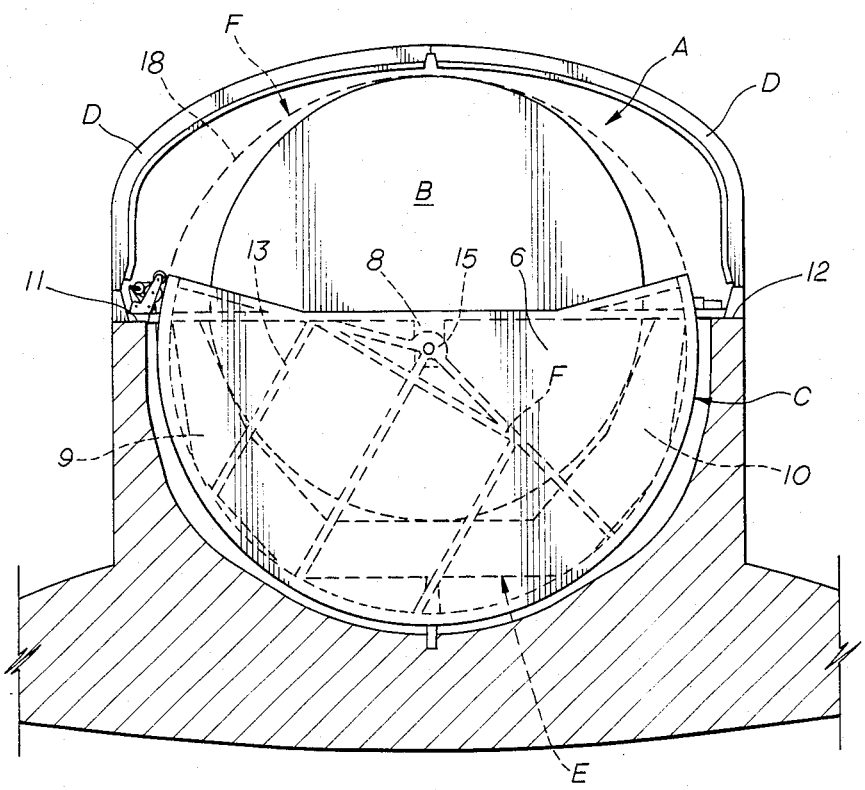
FIG. 1 is a cross-section through the novel sunshade device with the shading part retracted and compactly stored.
Figure 2:
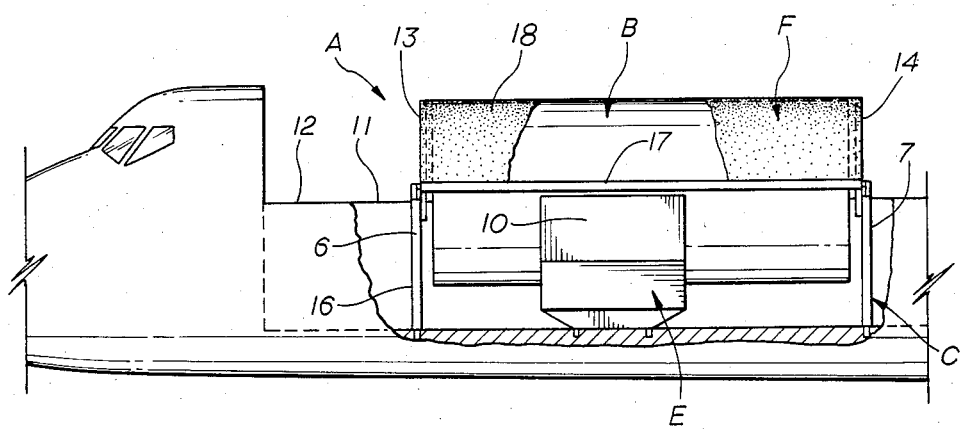
FIG. 2 is a side view of the shield device and its mount, with the shade extended, i.e. operative, and parts broken away.
Figure 4:
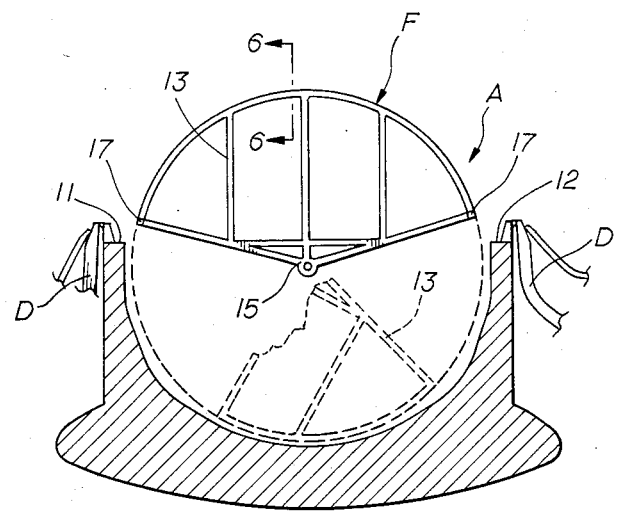
FIG. 4 is an inside elevation of one rotary end member of the rotary shading device.

When drive roller 26 is reversed, the shade material is drawn by its return spring means back onto its spring roller, while rotary member F is returned to the stored position of FIG. 1 by the action of cable 24 pulling on upper peripheral end of rotary end member 13. When curtain 18 is unwound during orbit, wide blanket 18 will not sag due to the absence of gravity. However, for applications in gravity environment, additional radial supports may be provided if needed. As can be seen in FIG. 4, the cross sectional shape of the shading device in the deployed or shading position is generally semicircular in form, whereas, in the open exposed position (FIG. 3) the rotary end members, being generally half-circular, present a generally flat, and somewhat lower, profile. Driving power may be manual or remotely controlled.

As applied to a sun ray sensitive cargo in the orbiter, the shade will normally be compactly wound and only deployed or unwound when the cargo doors are opened in orbit. The sun shield will be opened for satellite deployment.

As previously stated, the invention is not limited to the specific environment shown, but may be applied to other environments and may be powered to control the rotary sun shield as required. The invention may be otherwise modified as will occur to those skilled in the art, and exclusive use of all modifications as come within the appended claims is contemplated.

I claim:

1. A rectractable, self-deploying shading device adapted to selectively cover and uncover a subject area by moving a shading material from a compact storage position to an extended shading position comprising in combination:
   an elongated, spring biased roller,
   a flexible shading member adapted for winding on said roller and for unwinding therefrom,
   at least one rotary member having an arcuate periphery adapted for guiding and continuously supporting said flexible shading member as said flexible shading member is selectively moved from an open, exposed unshading position to an extended, closed shading position,
   means attached to the rotary member for drawing the shading member from the roller, and
   a deployment means for rotating said rotary member.

2. A retractable, self-deploying shading device comprising:
   a flexible shading member,
   a torsion biased roller adapted for winding the shading member thereon and for unwinding the shading member therefrom,
   a plurality of half-disc rotary members each having, in part, an arcuate periphery portion generally semicircular in form adapted for partially supporting the flexible shading member in a deployed shading position and in part, a substantially straight periphery portion providing a lower vertical profile in an open exposed position,
   at least one bar spanning the rotary members and attached to one end of the shading member adapted for withdrawing the shading member from the roller and for partially supporting the shading member as the rotary members are turned to the shading position, and
   a deployment means for selectively turning the rotary members in an unwinding direction to deploy the shading member to the closed shading position and for selectively turning the rotary members in a winding direction to permit retraction of the shading member to the open exposed position.

3. The shading device of claim 2 wherein the deployment means comprises:
   a plurality of elongated cables each associated with one of the rotary members and having a first end attached to a lower peripheral point on the rotary member and a second end attached to the bar spanning the rotary members,
   a plurality of bellcranks each associated with a cable and a rotary member and each having a first arm secured to the roller and a second arm secured to a cable tensioning bias, and
   a powered drive pulley adapted for moving the cable in a first direction so that its first end applies a force tangential to the periphery of the rotary member to rotate the rotary member about its axis in the unwinding direction to deploy the shading member to the closed, shading position and for moving the cable in a second direction so that the second cable end pulls tangentially to the periphery of the rotary member to rotate it in the winding direction, permitting the spring biased roller to retract the shading member to the open, exposed unshading position.

4. A method of deploying and retracting a flexible shading member, comprising the steps of:
   actuating a drive pulley to apply tension on a cable,
   applying a tangential force via the cable to a point on the periphery of a disc-like rotary member, rotating the rotary member about its axis,
   carrying, via the rotary member, a bar spanning the rotary member and an adjacent rotary member and to which one end of a flexible shading member is attached,
   drawing the flexible shading member from the spring biased roller on which it is wound, to a deployed position,
   retaining the shading member against the periphery of the rotary member as it is rotated by holding the shading member between the cable and the periphery of the rotary member, guiding and supporting the shading member on the periphery of the rotary member as the rotary member is rotated, shading an area between adjacent rotary members as the shading member is deployed, retracting the shading member by reversing the direction of rotation of the drive pulley to rotate, via tension on the cable, the rotary member in the direction opposite to that for deploying the shading member, winding the shading member onto the spring biased roller as it leaves the periphery of rotary members, and exposing the area between adjacent rotary members as the shading member is retracted.

* * * * *